(12) United States Patent
Saito

(10) Patent No.: US 7,575,359 B2
(45) Date of Patent: Aug. 18, 2009

(54) LIGHT GUIDE PLATE, METHOD AND APPARATUS FOR PRODUCING SAME, AND LIGHT SOURCE DEVICE AND LIQUID CRYSTAL DISPLAY UTILIZING SAME

(75) Inventor: Kazuhisa Saito, Minato-ku (JP)

(73) Assignee: Worldvision Co., Ltd., Minato-ku, Tokyo (JP)

( * ) Notice: Subject to any disclaimer, the term of this patent is extended or adjusted under 35 U.S.C. 154(b) by 0 days.

(21) Appl. No.: 10/562,960

(22) PCT Filed: Mar. 24, 2004

(86) PCT No.: PCT/JP2004/004021

§ 371 (c)(1),
(2), (4) Date: Dec. 30, 2005

(87) PCT Pub. No.: WO2005/001334

PCT Pub. Date: Jan. 5, 2006

(65) Prior Publication Data

US 2006/0146575 A1 Jul. 6, 2006

(30) Foreign Application Priority Data

Jun. 30, 2003 (JP) .............................. 2003-205523
Dec. 16, 2003 (JP) .............................. 2003-436547

(51) Int. Cl.
*F21V 8/00* (2006.01)

(52) U.S. Cl. ................... 362/625; 362/623; 362/626
(58) Field of Classification Search ................ 362/623, 362/625, 626, 628, 600, 561
See application file for complete search history.

(56) References Cited

U.S. PATENT DOCUMENTS

| | | | | |
|---|---|---|---|---|
| 5,359,691 A | * | 10/1994 | Tai et al. | ...................... 385/146 |
| 5,779,337 A | | 7/1998 | Saito et al. | |
| 6,068,382 A | * | 5/2000 | Fukui et al. | .................. 362/625 |
| 6,074,069 A | * | 6/2000 | Chao-Ching et al. | .......... 362/26 |
| 2003/0169586 A1 | * | 9/2003 | Miyashita et al. | ............. 362/31 |
| 2005/0243574 A1 | * | 11/2005 | Teng et al. | .................. 362/600 |

FOREIGN PATENT DOCUMENTS

| | | |
|---|---|---|
| EP | 0961076 | 12/1999 |
| JP | 2003-98356 | 4/2003 |
| WO | WO 01/51850 | 7/2001 |

* cited by examiner

*Primary Examiner*—Laura Tso
(74) *Attorney, Agent, or Firm*—Porzio, Bromberg & Newman, P.C.

(57) ABSTRACT

It is a light guide plate characterized by having a groove in a snaking pattern formed on a transparent plate made of acrylic or other materials with light transmitting characteristics. It substantially increases efficiency and its manufacturing cost can be greatly reduced.

9 Claims, 13 Drawing Sheets

(a)

(b)

LIGHT GUIDE PLATE, METHOD AND APPARATUS FOR PRODUCING SAME, AND LIGHT SOURCE DEVICE AND LIQUID CRYSTAL DISPLAY UTILIZING SAME

This application is a 371 of PCT/JP04/04021 filed Mar. 24, 2004.

BACKGROUND OF THE INVENTION

1. Field of the Invention

The present invention relates to a light guide plates that can be used for back lighting of TVs with liquid crystal displays, portable communication equipment, advertisement displays, etc., all of which are gaining popularity at remarkable rates these days.

2. Description of the Related Art

The backlight of a liquid crystal television and such requires a high durability of the power source, a high intensity, and a high uniformity of light. A typical backlight of prior art includes a silk dot printed membrane and a film lens.

Since some of these components are expensive to manufacture and more over dependant on specific manufacturers, so that they presented a problem in mass manufacturing. Consequently, there used to be too many hurdles to be cleared in order to achieve practical productivity and cost to make it applicable to the screens of liquid crystal televisions and portable information equipment. With the development in cellular telephones and other portable information equipment, their demands are increasing phenomenally, making its further substantial cost reduction strongly desirable.

SUMMARY OF THE INVENTION

The purpose of the present invention is to provide a light guide plate advantageous particularly in terms of mass production feasibility and production cost and the method of its manufacturing by eliminating the problems described above.

The light guide plate in accordance with the present invention is featured by having snaking grooves formed on a transparent plate made of light transmitting acrylic resin.

The method of manufacturing a light guide plate in accordance with the present invention is featured by forming a plurality of grooves each having a V-shaped cross section in snaking patterns on a transparent plate made of light transmitting acrylic resin using cutting tools.

Moreover, the light source apparatus in accordance with the present invention is featured in that it consists of a light guide plate made by forming a plurality of grooves each having a V-shaped cross section in snaking patterns on a transparent plate made of light transmitting acrylic resin and a light source arranged on the edges of said light guide plate, thus causing the light radiating from said light source to irradiate the inside of said transparent plate and to be reflected by said grooves, consequently causing said light guide plate to emit light.

Furthermore, the light guide plate in accordance with the present invention is featured by having grooves of V-shaped cross section formed to form snaking patterns on a transparent plate made of light transmitting acrylic resin plate.

The method of manufacturing a light guide plate in accordance with the present invention is featured by forming a plurality of grooves in snaking patterns on a transparent plate made of light transmitting acrylic resin using cutting tools.

The light guide plate in accordance with the present invention is equipped with a light-transmitting transparent plate, a first set of grooves a snaking pattern formed on a surface of said transparent plate, and a second set of grooves with a snaking pattern formed to intersect or contact with said first group of grooves on said surface, so that the light passing through said transparent plate can reflect on said first and second groups of patterned grooves.

Moreover, the light guide plate manufacturing apparatus in accordance with the present invention is to form a plurality of rows of grooves on the transparent plate simultaneously consisting of using a plurality of tool bits affixed on a blade, consisting of a rocking motion unit that moves said blade back and forth in a rocking manner and a translating motion unit that relatively moves said blade along a groove's translation direction on said transparent plate, wherein said blade provides a plurality of tool bits, i.e., a first set of tool bits, for forming the first set of grooves with the snaking pattern and a second set of tool bits that are positioned a specified distance apart from said first set of tool bits for forming the second set of grooves that are a certain snaking phase difference apart from said first set of grooves.

It is preferable to use a transparent plate made of transparent acrylic resin and the like in the present invention. Also, it is preferable to constitute a cutting blade by arranging tool bits such as common glass cutting tool bits in a staggered pattern. This should make it easier to generate V-shaped grooves in snaking patterns. More specifically, it is possible to form two groups of snaking grooves that contact or cross with each other in one process if the first set of tool bits and the second set of tool bits are arranged on the blade in staggered fashions and are moved back and forth.

The grooves formed in a staggered fashion can uniformly reflect the light that passes through the inside of the transparent plate mad of acrylic resin without wasting any part of it to cause it to be radiated outside. Although there can be many ways to form a groove with a V-shaped cross section, a high accuracy V-shaped groove can be formed easily and inexpensively if a diamond tool and the like is used.

Since the light entering into the inside of the transparent plate made of acrylic resin is emitted outside after being reflected evenly by means of the snaking grooves, so that highly intensified light can be emitted outside. For example, such a light emission can be effectively used as the back light of a liquid crystal display.

Since a plurality of snaking grooves are generated to form a snaking pattern in the present invention, it is possible to achieve durability, high longevity and low manufacturing cost because of its simple constitution. While various kinds of light sources can be used, an LED (light emitting diode) lamp, which is a kind of semiconductor light source, or an EL (electro-luminescence) lamp is preferable as the light source of the present invention, because of their low power consumption characteristics. While EL has a lower light intensity compared to a fluorescent lamp or an incandescent lamp, it is superior in terms of longevity and power consumption. It is most suitable for liquid crystal television sets, cellular telephones, and portable information equipment. Since the power source is almost permanent, there is only minimum maintenance requirement.

BRIEF DESCRIPTION OF THE DRAWINGS

The above and other objects, features and advantages of the present invention will become apparent from the following description and appended claims, taken in conjunction with the accompanying drawings.

DETAILED DESCRIPTION OF THE PREFERRED EMBODIMENTS

Each case of the embodiments will be described with reference to the drawings in the following:

Embodiment 1

Figure 1:
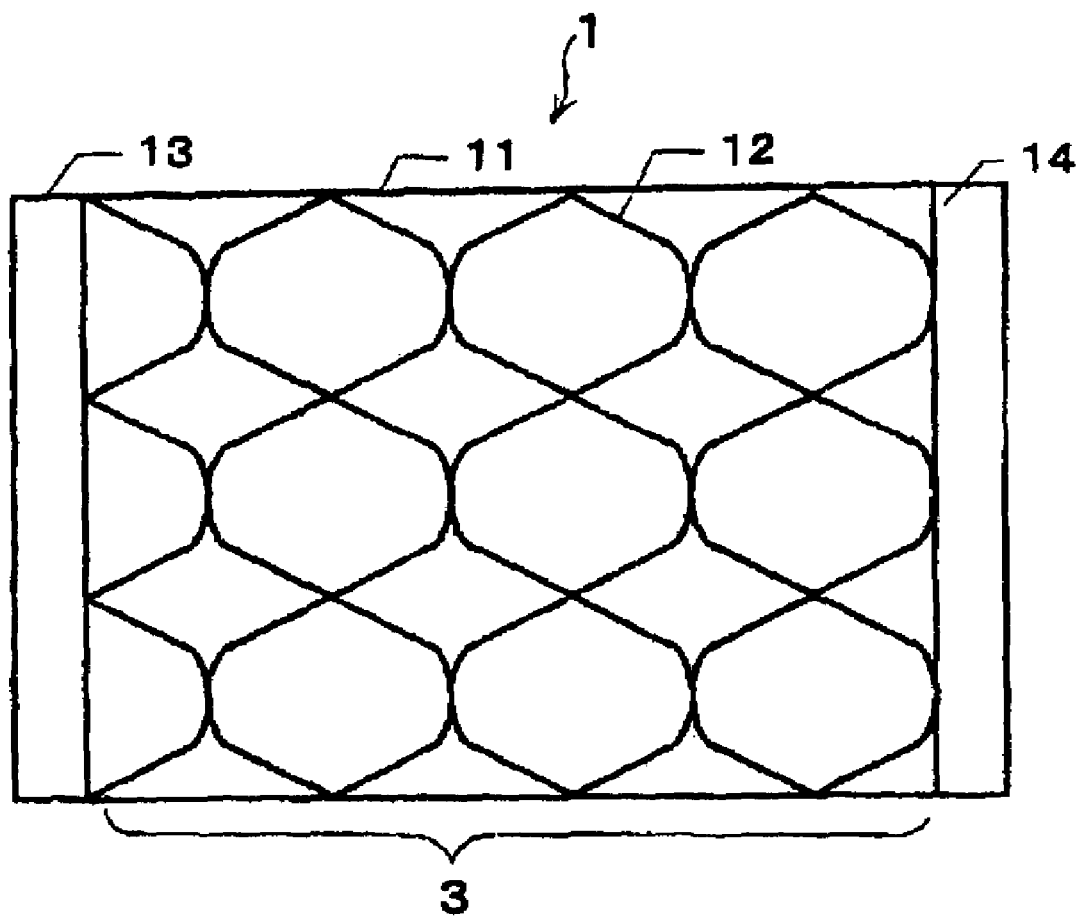
FIG. 1 shows the overall constitution of a light guide plate.
Figure 2:
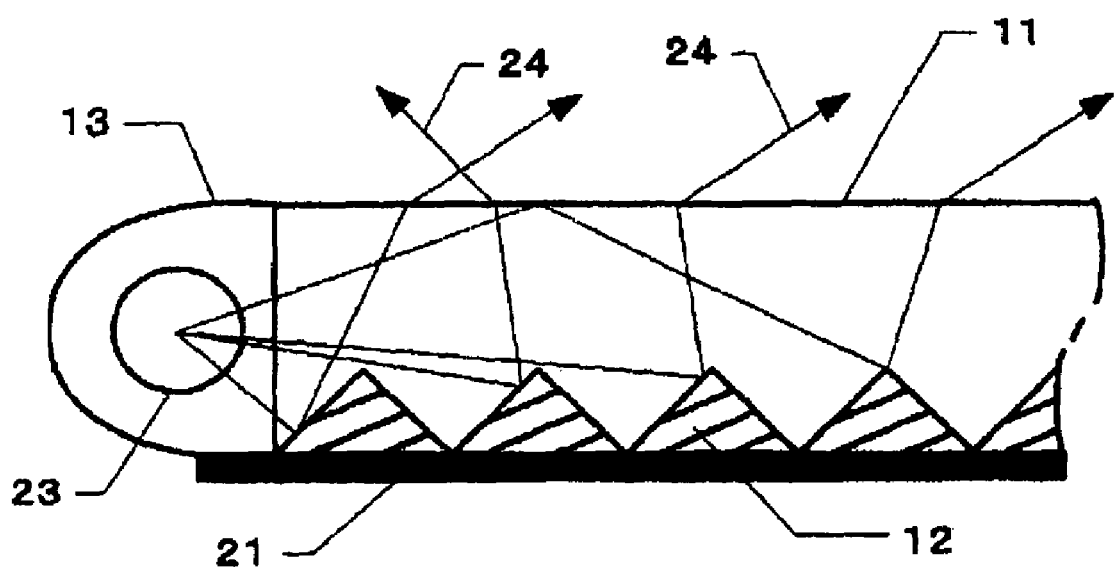
FIG. 2 shows the internal constitution of a light guide plate.

The light source apparatus according to the first embodiment of the present invention will be described with reference to FIG. 1 and FIG. 2. It should be noted that FIG. 1 is a plan view and FIG. 2 is a cross-sectional view. A light source apparatus 1 is equipped with a light guide plate 3 and a light source 23. The light guide plate 3 consists of an acrylic resin plate 11, and V-shaped grooves 12 each having a V-shaped cross section are formed on the surface of the acrylic resin plate 11 by machining. The V-shaped grooves 12 are formed in a snaking pattern. The light sources 23 are provided on the left and right edges of the acrylic resin plate 11 and are covered with semicircle reflectors 13 and 14.

Although fluorescent lamps are used as the light sources 23 in this case, cold-cathode tubes, LEDs, ELs and the likes can be used instead. Organic ELs are particularly suited because of their high lighting efficiency. Although the light source 23 is arranged on the left and right edges of the plate in case of FIG. 1, it is also possible to have them arranged above or below the plate as well as on the left and right edges of the plate in order to achieve higher light intensity, while it is also possible to use a single light source if the capacity of the light source 23 is high enough.

How the light becomes divergent light 24 as a result of reflecting in numerous directions from the V-shaped grooves 12 will be described below with reference to FIG. 2. The rays radiating from the light sources 23 are reflected by the reflectors 13 and 14 toward the inside of the light guide plate 3. Those rays are reflected by the V-shaped grooves 12 without wasting any part of them to be emitted to the outside of the acrylic resin plate 11. As a result, the light is amplified. Since the V-shaped grooves 11 are formed curvilinearly in a snaking pattern in this embodiment, the light is reflected without wasting any part of it regardless the location of the light source. For example, even when the light source 23 is located on each edge of the light guide plate 3, it would produce a uniform reflection of the light.

In addition, in case of the light source apparatus 1, a reflector 21 is provided on the side of the light guide plate 3 on which the V-shaped grooves 12 are formed. This reflector 21 reflects the rays that are heading toward downward in FIG. 2 of the light guide plate 3 (i.e., the side of the plate on which the V-shaped groove 12 is formed) to guide them into the inside of the light guide plate 3. As the V-shaped grooves 12 are snaking, the rays that enter the light guide plate 3 repeat reflections without losing any part of them and exit the plate thus creating a surface emission light.

Therefore, although it is not shown graphically, this arrangement works as aback light of an LCD (Liquid Crystal Display) if it is placed on the top side (i.e., the opposite side of the light guide plate 3 on which the V-shaped grooves 12 are formed) of this light source apparatus 1. If the film-like color medium is placed in lieu of the liquid crystal, it can be used as an advertisement or guidance display by casting light on the back of it through the light guide plate according to the present invention.

Embodiment 2

Next, the second embodiment of the invention will be described with reference to FIGS. 3 thorough 5. Here a method of manufacturing the light guide plate 3 described in the first embodiment will be described. In other words, it relates to a method of cutting the snaking V-shaped grooves efficiently. It has hitherto been customary to generate such V-shaped grooves by laser machining. Even after the best convergence, a laser beam still is an ellipse with a diameter of several tens of μm. Therefore, it is very difficult to make a sharp V-shaped groove required in this invention. Another problem with the laser machining is its high cost.

Figure 3:
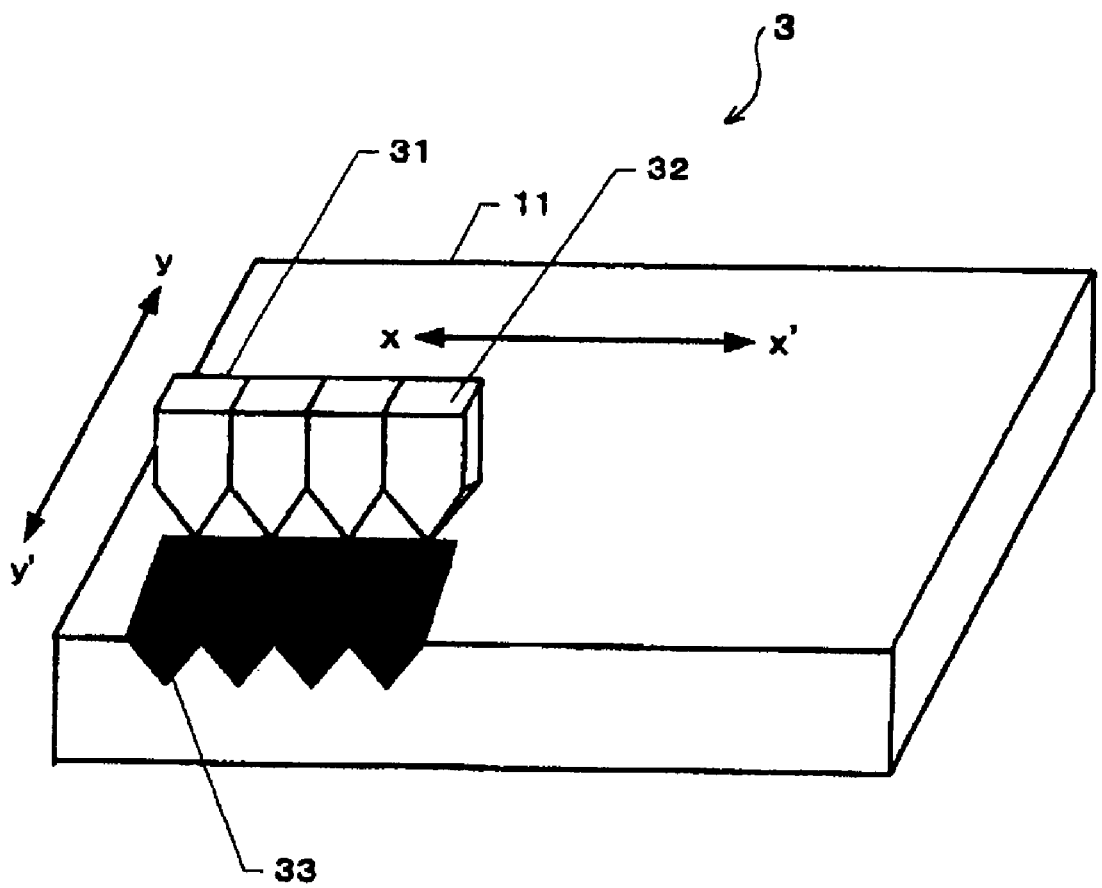
FIG. 3 shows the method of cutting the V-shaped groove and how a V-shaped groove is formed.

FIG. 3 shows a method of making a snaking pattern of V-shaped grooves using a tool blade 32 on which a group of tool bits 31 designed for V-shaped groove cutting is arranged.

FIG. 3 shows an acrylic resin plate 11, tool bits 31 with diamond tips to the each point of them, and a blade 32 on which the tool bits are arranged. It also shows V-shaped grooves 33 cut by the tips of the tool bits 31. More specifically, the acrylic resin plate 11 is moved in the X-X' direction while moving the blade in the Y-Y' direction simultaneously to generate the V-shaped grooves 33 in a snaking pattern.

Figure 4:
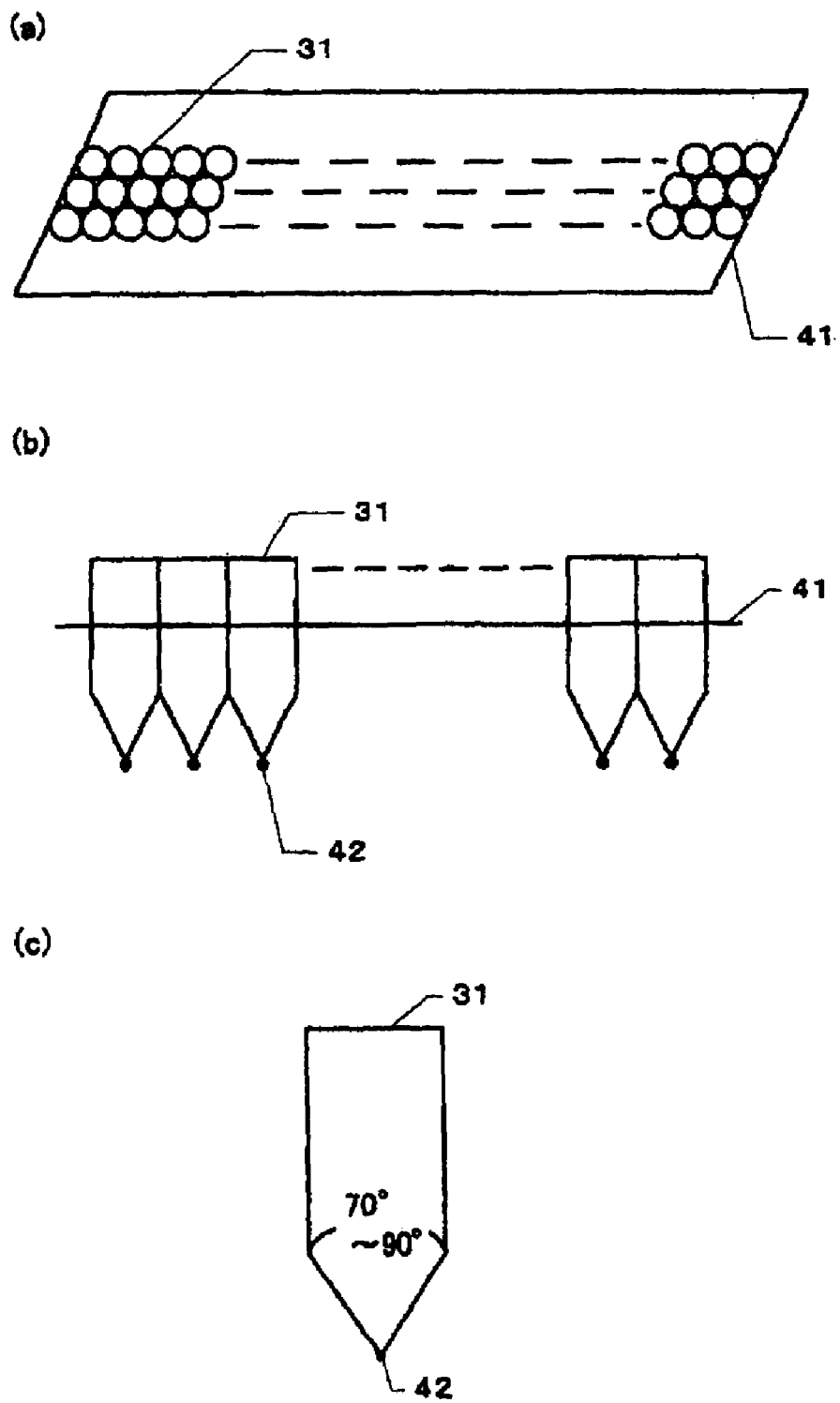
FIG. 4 shows the overall constitution of a blade and tool bits.

FIG. 4 shows the configuration of the tool bits 31 for generating a snaking pattern of V-shaped grooves 33 by cutting. FIG. 4(a) show a blade 41 on which tool bits 31 are arranged. The tool bits 31 are arranged in a plurality of rows and in a staggered fashion in order to achieve a snaking motion and cutting efficiently. The blade 41 is identical to the item 32 of FIG. 3.

FIG. 4(b) is a cross section of the blade 41. It shows the tool bits 31 arranged on the blade 41 in a staggered fashion. It also shows a diamond tip 42 which can generate a V-shaped groove 33 more sharply and with an acuter angle than the laser beam. The side of the V-shaped groove 33 that reflects the light is finished smoother than in the laser machining and sharper so that it provides a better reflecting efficiency.

FIG. 4(c) shows the construction of the tool bit 31. The angle of the V-shaped groove 33 formed on the light guide plate 3 is finished at 70°-90° to achieve a better reflection efficiency. This diamond tip 42 provides a better machining result causing better reflections without any waste of light. In case of the laser machining, it not only requires several times of laser irradiation but also results in poorer surface finish on the V-shaped groove 33. The laser machining produces microscopic undulation that decrease reflection efficiency.

Figure 5:
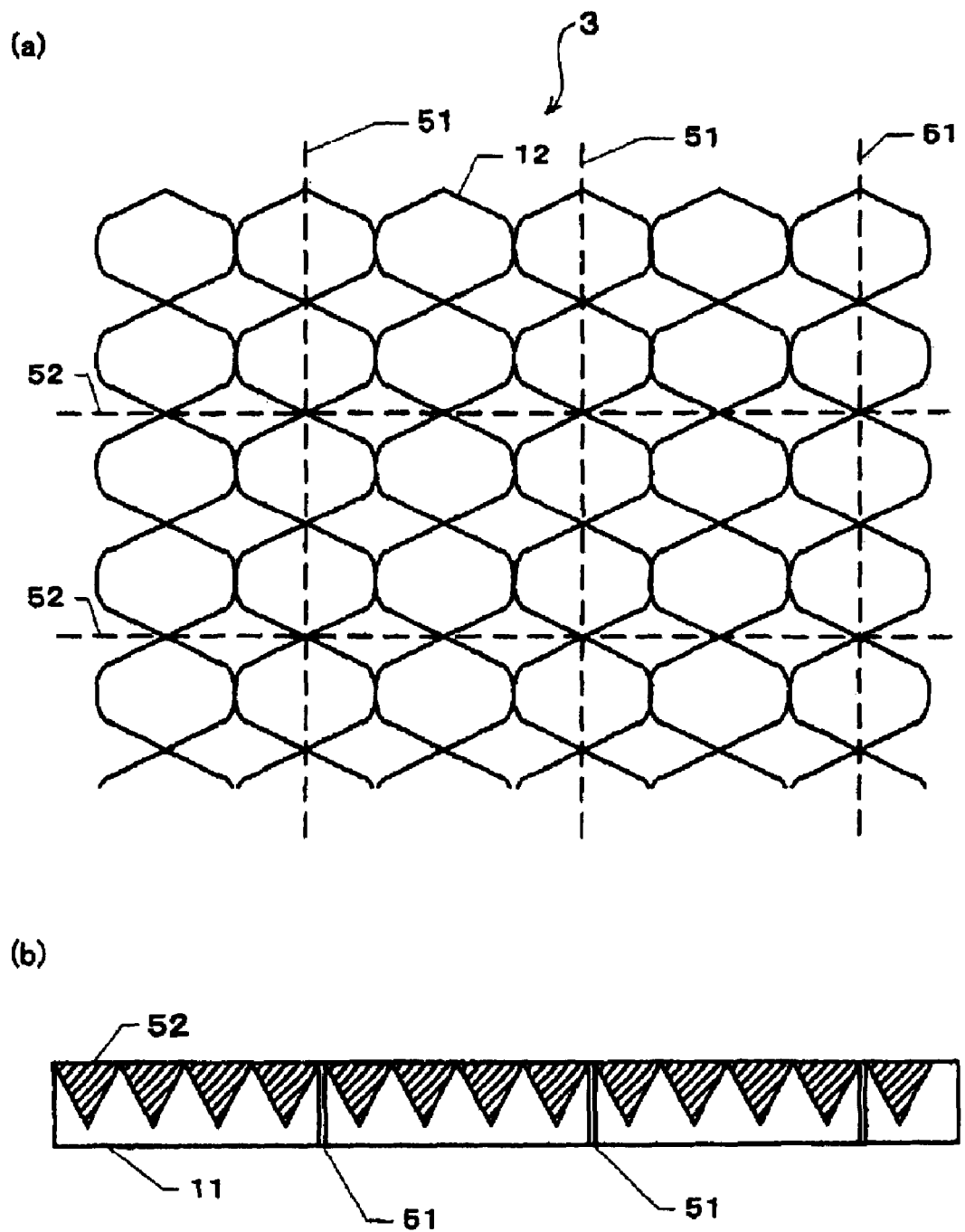
FIG. 5 shows the overall constitution of a snaking pattern and V-shaped grooves.

FIG. 5 shows the light guide plate 3 manufactured by machining the acrylic resin plate 11 using the tool bit 31 and a diagrammatic view of the pattern and shapes of the groves. FIG. 5(a) is the plan view of the acrylic resin plate 11. It also shows the snaking pattern 12 of the V-shaped grooves obtained by machining the acrylic resin plate 11. In the drawing, the numeral 51 represents grooves machined in the Y-direction and 52 represents the grooves machined in the X direction. Throughout this specification, the overall condition of forming such a plurality of grooves is described as the "pattern."

The machined grooves 51 and 52 are used for ease of bending and cut-off for the shapes in accordance with applications. FIG. 5(b) shows the cross section of FIG. 5(a), indicating that the V-shaped grooves 52 and the machined grooves 51 for appropriate shape are formed on the acrylic resin plate 11. In case of the light guide plate 3 to be used on the LCD for television, it is preferable to form a snaking pattern that goes back and forth several tens (over 10 times) of times to several hundred times (less than 1000 times).

Embodiment 3

Figure 6:
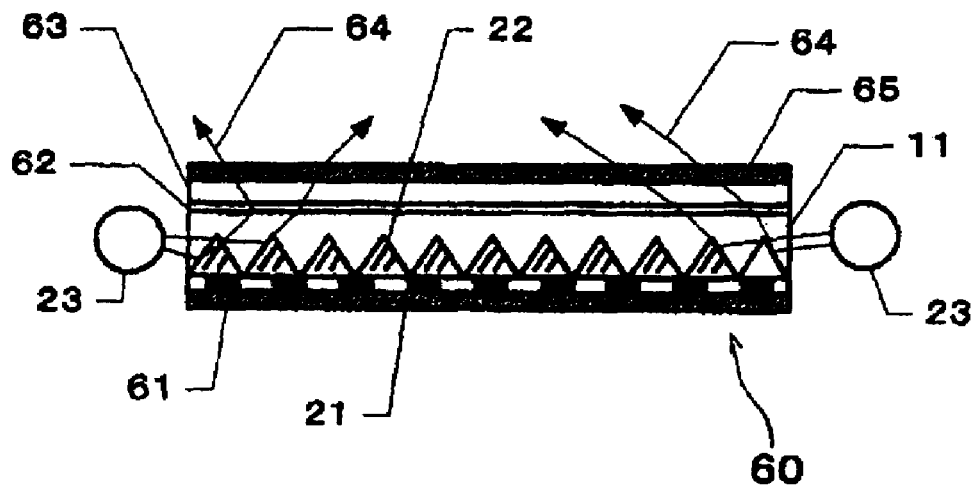
FIG. 6 shows diagrammatically how the light is reflected inside a light guide plate.
Figure 6:
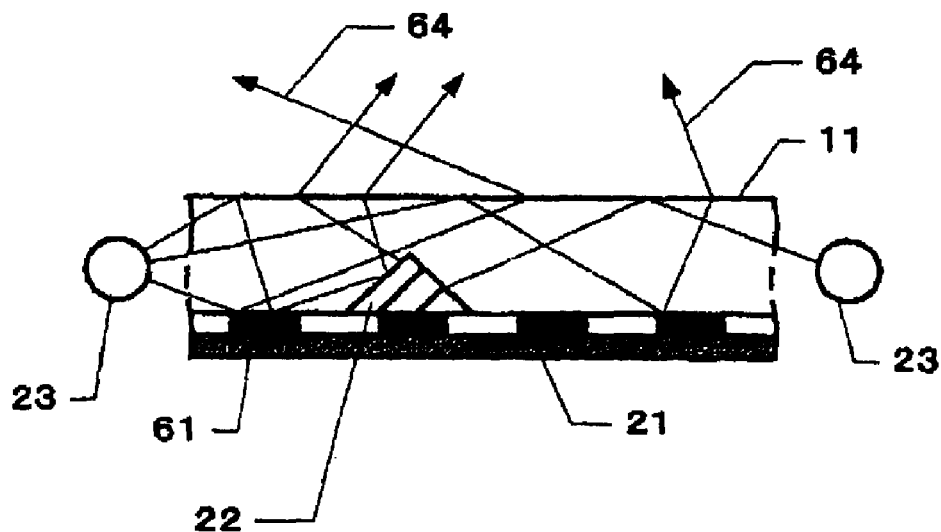

Next, an LCD 60 according to the third embodiment of the present invention will be described with reference to FIG. 6. The LCD 60 is equipped with a light guide plate 11 and a liquid crystal panel 65. In FIG. 6(a), the light radiated from the light source 23 hits the side of the V-shaped groove 22 and passes through the lens film 62 to be intensified. A light diffusion plate 63 causes the light to diffuse when the light passes through it, thus making it a uniform light to be radiated from the back of a liquid crystal panel 65 to light up the entire screen of the liquid crystal panel 65 as a back light.

On the other hand, a portion of the light that is emitted by the light source 23 hits a silk dot 61 to be reflected, and hit the side of the V-shape groove 22 again to be reflected. The silk dot for light reflection is formed by printing.

Other rays emitted by the light source hits neither the V-shaped groove 22 nor the silk dot 61 and arrived at the reflector 21 directly. This light is reflected by the reflector 21. Moreover, after having been reflected on the side of the V-shaped groove 22 and repeating reflections within the light guide plate, the intensified light is radiated as the back light 64. Thus, the light emitted by the light source 23 works efficiently without wasting any part of it.

FIG. 6(b) is a diagrammatic view showing how the light emitted by the light source toward the light guide plate 64 is reflected. Even if a ray misses the side of the V-shaped groove 22, it can still hit the silk dot 61 or the reflector 21 repeatedly, so that it is not wasted. The backlight of the light guide plate 64 functions effectively with a sufficient intensification.

Embodiment 4

Figure 7:
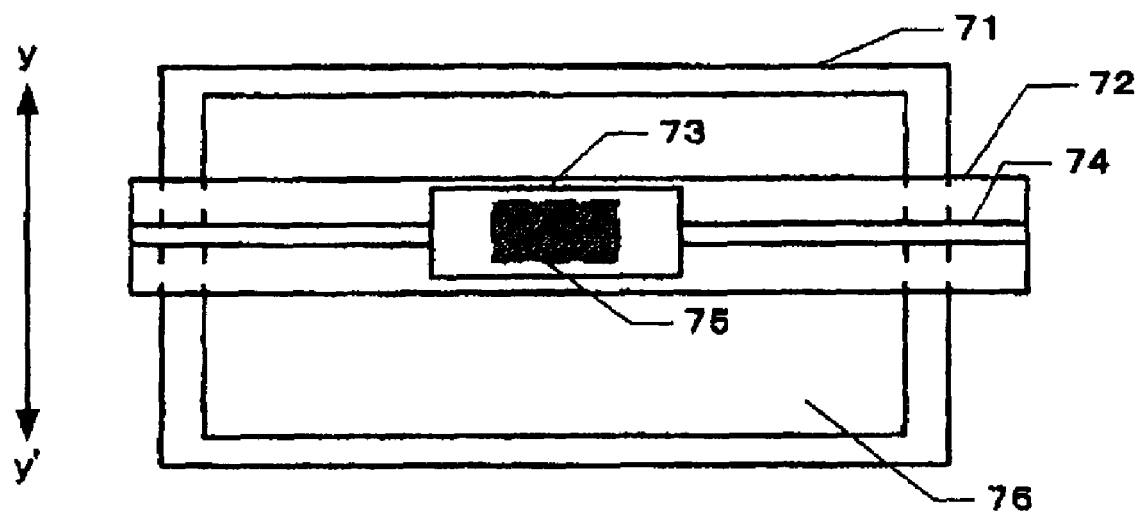
FIG. 7 shows a flat plane of a light guide plate manufacturing apparatus.

Next, a light guide plate manufacturing apparatus 71 concerning the fourth embodiment of the invention will be described below with reference to FIGS. 7 and 8. The light guide plate manufacturing apparatus 71 is also called an acryl resin cutting apparatus and is equipped with a movable unit 72, a slide unit 73, and a blade unit 75 as shown in FIG. 7. The numeral 76 in the drawing denotes an acrylic resin plate.

The movable unit 72 is provided with a linear slide shaft 74 in order to guide a slide unit 73 in the X axis direction for machining the V-shaped groove on the acrylic resin board 76 as the workpiece, in snaking pattern.

As to the detail of the blade unit 75, it was described already with reference to FIG. 4. The entire movable unit 72 moves from Y to Y' to cause the drive unit 73 to be in motion. While the drive unit 73 is traveling, the blade unit 75 reciprocates in the X-direction. As a result, it machines the V-shaped grooves in a snaking pattern on the acrylic resin plate 76. Although the case of moving the slide unit 73 is shown here, it is also possible to arrange it in such a way as to move the acrylic resin plate 76.

Figure 8:
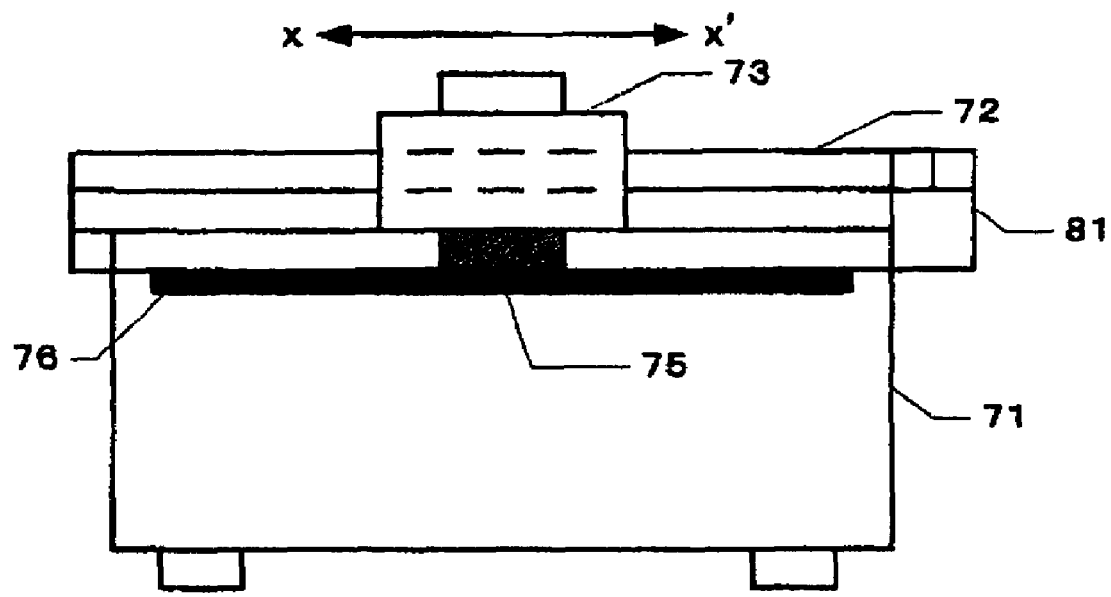
FIG. 8 shows a cross section of a light guide plate manufacturing apparatus.

FIG. 8 shows a cross section of the light guide plate manufacturing apparatus 71. The numeral 81 denotes a cylinder for adjusting the slide unit 73 in a vertical direction and to adjust the cutting depth of the blade unit 75 exactly.

Figure 9:
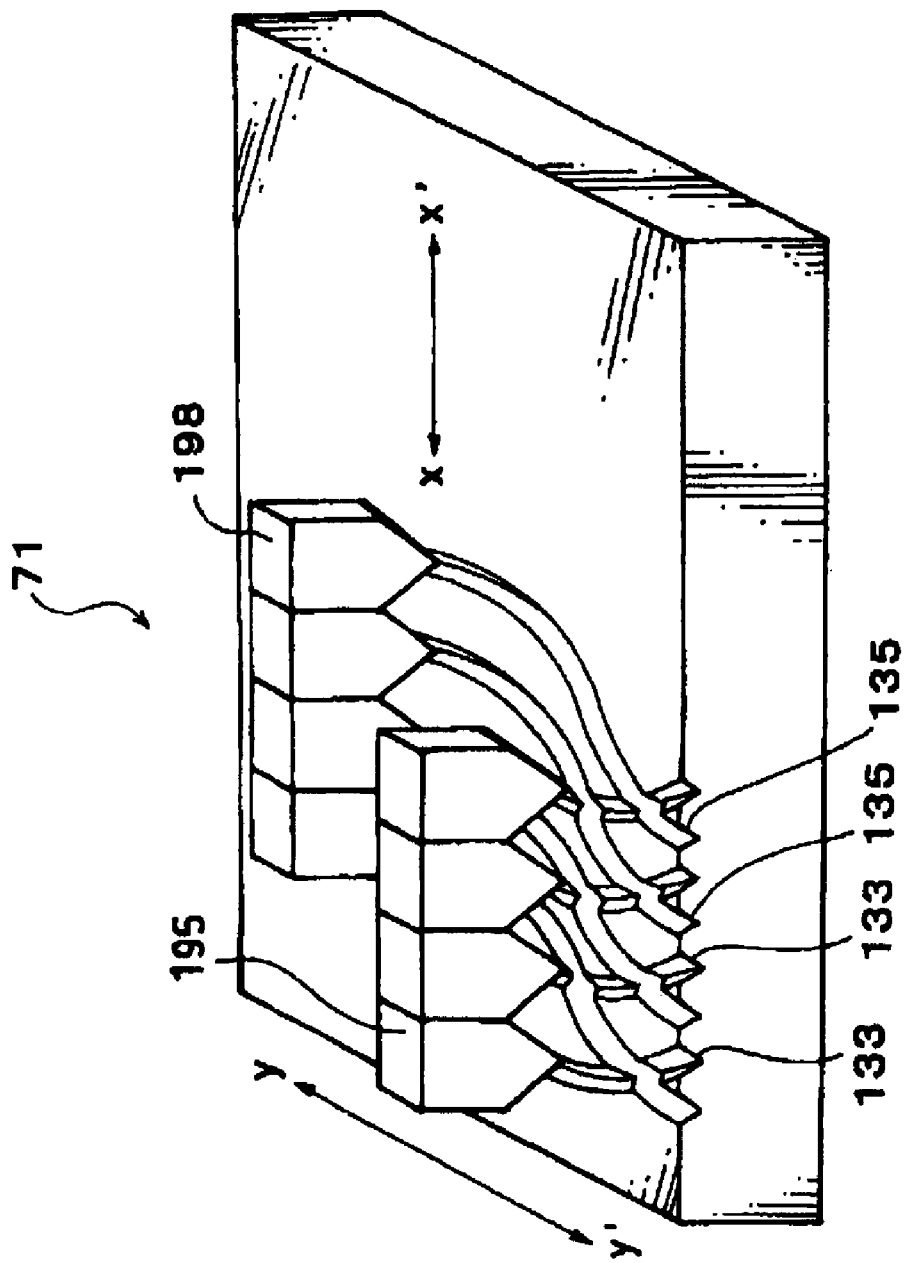
FIG. 9 shows a machining process of a light guide plate manufacturing apparatus.

Next, the process of forming the grooves by means of the light guide plate manufacturing apparatus 71 with reference to FIG. 9.

As described before, the blade unit 75 is moved back and forth in the X-X' direction by means of the movable unit 72. It is also possible to cause the blade unit 75 to make a relative motion in the Y-Y' direction (i.e., the translating direction of the grooves 133) over the acrylic resin plate 76.

The blade unit 75 has a first tool bit set 195 and a second tool bit set 198 mounted on it. The first tool bit set 195 has a plurality of rows of tool bits in order to be able to form the first tool bit grooves 133 in a parallel and snaking pattern. The second tool bit set 198 also has a plurality of rows of tool bits in order to be able to form the second tool bit grooves 135 in a parallel and snaking pattern.

The second tool bit set 198 is arranged with a certain space apart from the first tool bit set 195 in the groove's translating direction (Y-Y' direction). When the first tool bit set 195 and the second tool bit set 198 are moved simultaneously back and forth, it will create a phase difference between the first pattern of grooves 133 and the second pattern of grooves 135 equivalent to the aforementioned space. This makes it possible to form two or more sets of grooves of snaking patterns with different phases in one operation drastically reducing the total manufacturing cost. The number of snaking patterns can be easily increased by increasing the number of the tool bit sets. This explains the reason why the tool bits are arranged in staggered multiple rows as shown in FIG. 4(a).

Embodiment 5

Figure 10:
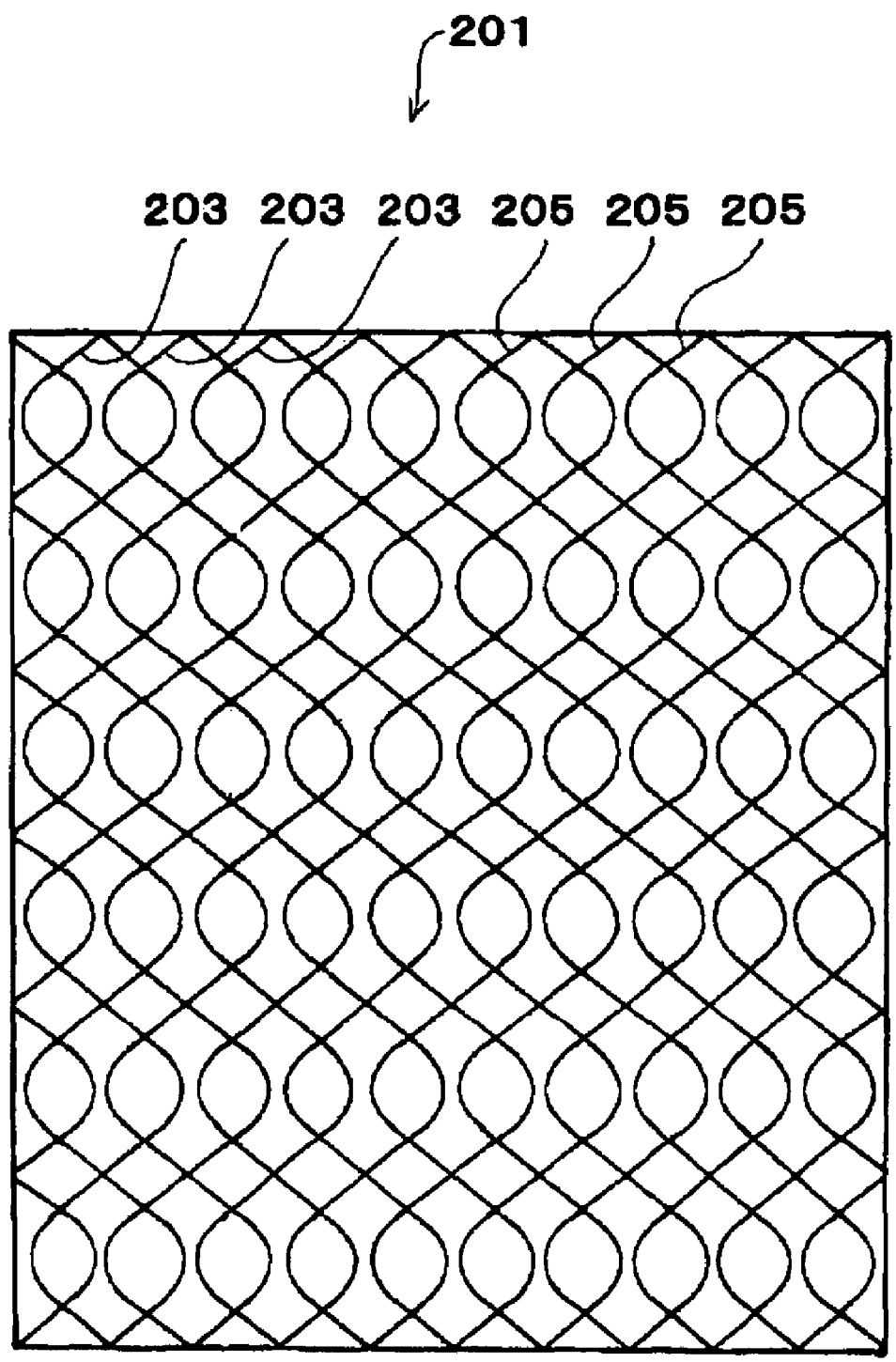
FIG. 10 shows the overall constitution of a light guide plate.

Next, a light guide plate 201 in accordance with the fifth embodiment will be described in the following with reference to FIG. 10. The light guide plate 201 is made of an acrylic resin and a first snaking pattern of grooves 203 and a second snaking pattern of grooves 205 are formed on its surface. These grooves are also formed by cutting tool bits as described before.

The first pattern of grooves 203 consists of a plurality of grooves formed in a pattern snaking in parallel with a constant amplitude and a constant cycle. The second pattern of grooves 205 is formed similarly to the first pattern of grooves 203 with the same amplitude and cycle and the translation direction of the grooves (direction of snaking) as those of the first pattern but with a phase difference. More specifically, there is a phase gap of 180 degrees, i.e., one half of the wavelength, between the two sets of patterns. Consequently, the second pattern of grooves 205 intersect with the first pattern of grooves 203 efficiently.

Although it is shown here that the first pattern of grooves 203 intersects with the second pattern of grooves 205, it is also possible to make them contact (abut) with each other rather than intersect with each other by reducing the amplitude. Because these patterns are arranged to intersect or contact with each other, all the rays that proceed in numerous directions with the light guide plate 201 are efficiently caught by the first and second patterns of groves 203 and 205, thus improving the reflection efficiency. The method of forming snaking patterns of grooves also has an advantage over forming linear grooves in that the strength of the light guide plate 201 can be improved. This is due to the reason that the stress caused by deterioration of the acrylic resin or an external force concentrates in the valley portion of the groove in case of a linear groove. Moreover, it is preferable to form the first pattern of grooves 203 and the like in sinusoidal waveforms.

Embodiment 6

Figure 11:
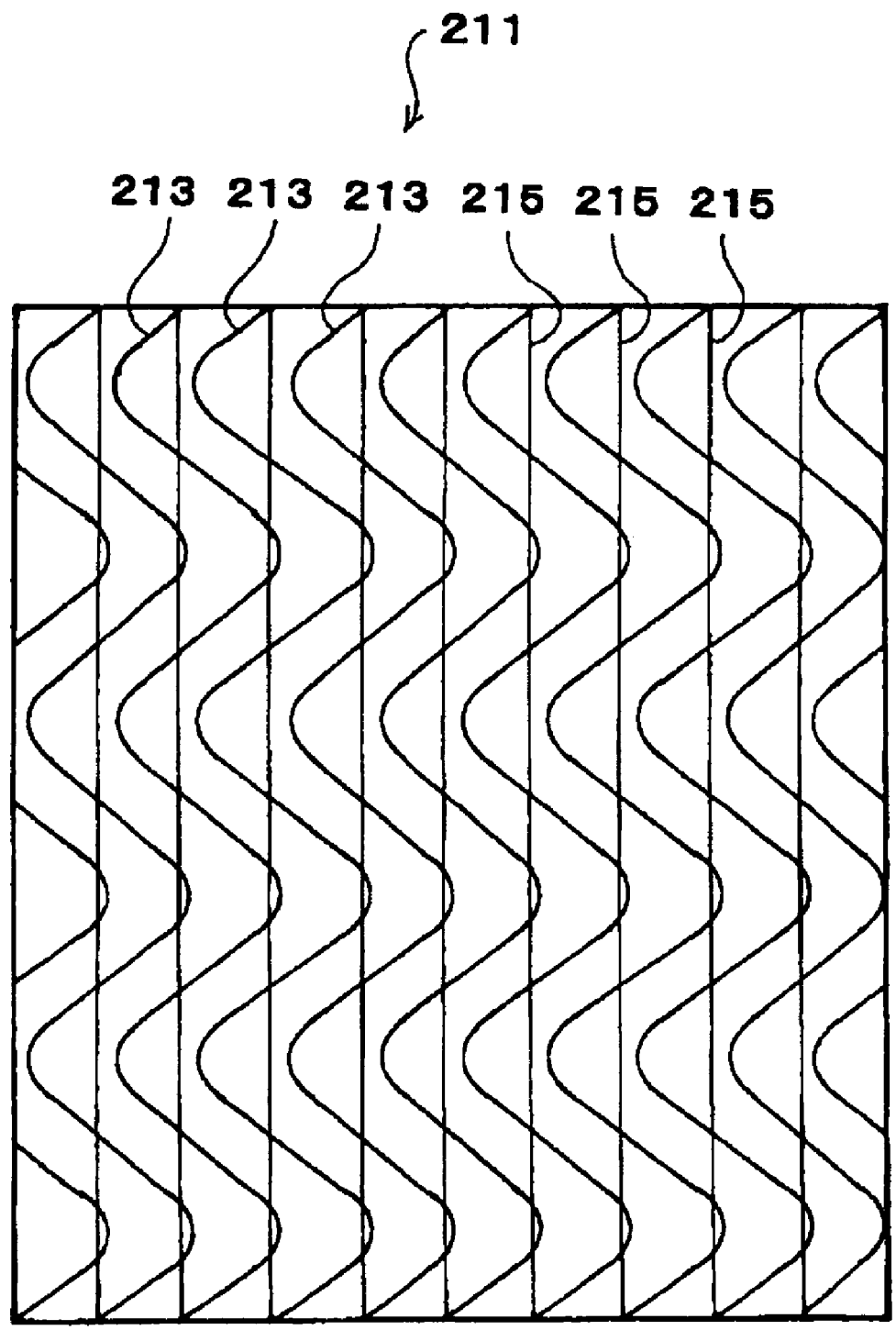
FIG. 11 shows the overall constitution of a light guide plate.

Next, a light guide plate 211 in accordance with the sixth embodiment will be described in the following with reference to FIG. 11. The light guide plate 211 is made of an acrylic resin similar to the fifth embodiment and a first snaking pattern of grooves 213 and a second linear pattern of grooves 215 are formed on its surface. This also makes it possible to make the first pattern of grooves 213 to intersect or contact with the second pattern of grooves 215 in order to improve the reflection efficiency by adjusting the amplitude of the patterns, etc. Since linear grooves can be formed more easily, the manufacturing cost can be reduced accordingly.

Embodiment 7

Figure 12:
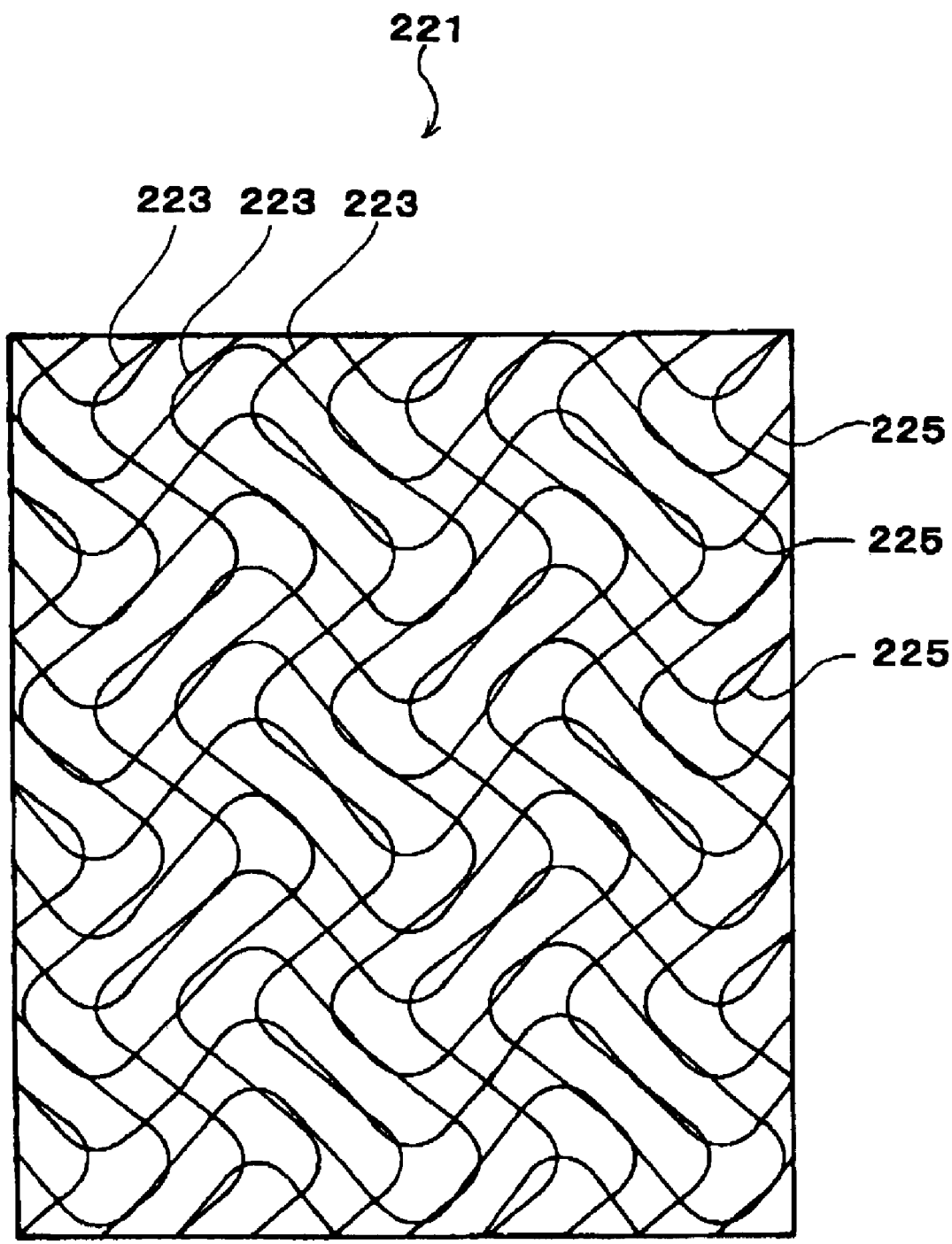
FIG. 12 shows the overall constitution of a light guide plate.

Next, a light guide plate 221 in accordance with the seventh embodiment will be described in the following with reference to FIG. 12. The light guide plate 221 is made of an acrylic resin and a first snaking pattern of grooves 223 and a second snaking pattern of grooves 225 are formed on its surface. However, the translation direction of the grooves of the first pattern of grooves 223 is not parallel to that of the second pattern of grooves 225, or more specifically, they intersect at 90 degrees. It is possible to make the first pattern of grooves 223 and the second pattern of grooves 225 to intersect more effectively by causing the translation directions of the grooves non-parallel. It also provides an effect of equalizing the light reflection characteristics in the vertical and horizontal directions as in FIG. 12, thus making it more desirable when the light is introduced from all four sides of the plate. Although it is shown here only a case of both patterns being snaking patterns, it is also possible to make the second pattern of grooves 225 to be a linear pattern.

Embodiment 8

Figure 13:
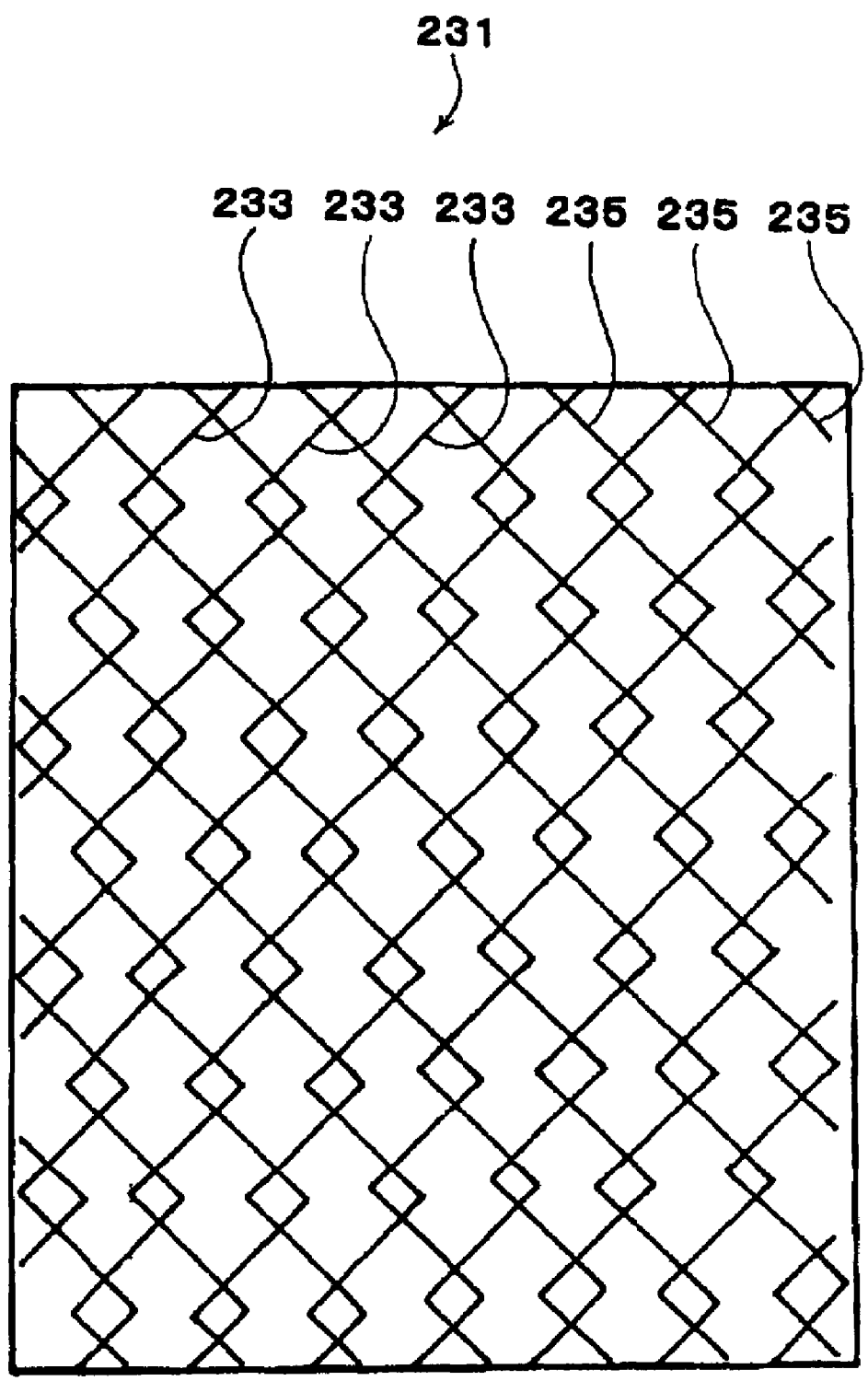
FIG. 13 shows the overall constitution of a light guide plate.

Next, a light guide plate 231 in accordance with the eighth embodiment will be described in the following with reference to FIG. 13. The first and second snaking patterns of grooves are formed on the light guide plate 231.

The first and second patterns of grooves 233 and 235 are formed by noncontiguously combining straight line segments of two different directions creating zigzagging patterns. The snaking patterns consisting of curvilinear or linear patterns can also be formed to snake continuously. The snaking patterns can also be formed to snake discontinuously as shown here. It is also possible to make the snaking grooves of combining linear or curvilinear grooves and it is also possible to make the snaking grooves of combining continuous or discontinuous grooves.

The translation directions of the first pattern of grooves 233 and that of the second pattern of grooves 235 are parallel and intersect with each other depending on the amplitudes of the snaking patterns. More specifically, since the phase difference is set approximately 90 degrees, the tips of the zigzag patterns intersect with each other. It is possible to enhance the reflection efficiency by causing intersections of the first pattern of grooves 233 and the second pattern of grooves 235 as shown here. Moreover, by making the translation directions of snaking patterns parallel as shown here, it is possible to reduce the total manufacturing cost as the first and second patterns of grooves 233 and 235 can be machined simultaneously as shown in FIG. 9. It is preferable to set the snaking amplitude to be larger than the spacing between the adjacent grooves.

Although it is not shown here, it is also possible to combine snaking patterns by combining straight line segments of three different directions as another version of the eighth embodiment. For example, it is possible to have a snaking trapezoidal pattern of grooves formed by combining groove segments of the vertical direction in FIG. 13, in addition to the groove segments translating in two directions shown in FIG. 13. It is possible to come up with a hexagonal pattern by forming areas surrounded by the first trapezoidal patterns of grooves and second trapezoidal patterns of grooves which intersect or contact with each other. It is possible to provide a light guide plate that grows in a broader range by reflecting lights in more different directions thus creating patterns of a honeycomb structuring by combining such snaking grooves.

Although it has been described in the above embodiments to combine two kinds of snaking patterns, it goes without saying that it is possible to combine three or more patterns of groove translation directions or snaking shapes (including cases of combining patterns of different amplitudes and phases). For example, it is also possible to form a pattern of three or four strands.

INDUSTRIAL APPLICABILITY

As mentioned before, the present invention makes it possible to manufacture a light guide plate using conventional cutting tools in less manufacturing steps without recourse to an expensive laser process, thus substantially reducing the total manufacturing cost. Cutting, rather than laser machining, also generates smoother edges of the V-shaped grooves with sharper valleys, so that it can produce a light guide plate that reflects lights more efficiently and provides a higher efficiency, thus providing a surface emitting light source of a high intensity. Consequently, the light guide plate according to the present invention can be suitably used as the back light for liquid crystal TV, PDA (Personal Digital Assistant, or portable information equipment), cellular telephones, advertisement displays, etc.

The entire disclosure of Japanese Patent Application No. 2003-205523 and 2003-436547 filed on Jun. 30, 2003 and Dec. 16, 2003 respectively including specification, claims, drawings, and summary are incorporated herein by reference in its entirety.

What is claimed is:

1. A light guide plate characterized in comprising:
   a transparent plate having light-transmitting characteristics;
   a first snaking pattern of grooves formed on said transparent plate; and
   a second pattern of grooves that is formed to intersect or contact with said first pattern of grooves on said surface, said second pattern of grooves is formed in a snaking pattern;

wherein the light that passes though said transparent plate is reflected by said first pattern of grooves and said second pattern of grooves;

characterized in that said first pattern of grooves and said second pattern of grooves intersect or contact with each other as a result of having said first pattern of grooves' and said second pattern of grooves' translating directions are set substantially parallel to each other and their snaking phases we set different from each other.

2. The light guide plate claimed in claim 1 characterized in that the difference of the snaking phases of said first pattern of grooves and said second pattern of grooves is set to approximately 180 degrees.

3. The light guide plate claimed in claim 1 wherein a plurality of said first pattern of grooves and a plurality of said second pattern of grooves are formed.

4. The light guide plate claimed in claim 1 characterized in having said first pattern of grooves snakes partly in a curvilinear form.

5. A light guide plate claimed in claim 1 characterized in having said first pattern of grooves snaking substantially in a sinusoidal form.

6. The light guide plate claimed in claim 1 characterized in having said first pattern of grooves snaking in a form of straight line segments combined noncontiguously.

7. The light guide plate claimed in claim 1 characterized in having hexagonal areas surrounded by said first and second patterns of grooves that are intersecting or contacting with each other.

8. A light source apparatus characterized in comprising: a light guide plate claimed in claim 1; and a light source disposed on said light guide plate's edge, wherein said groove with the V-shaped cross section reflects light emitted by said light source into said light guide plate's inside so that said light guide plate radiates the light outside.

9. A liquid crystal display device characterized in comprising: a light source apparatus claimed in claim 8; and a liquid crystal panel disposed in parallel with said light guide plate.

* * * * *